Dec. 8, 1959   M. M. KAISER   2,916,145
FILTER CONSTRUCTION
Filed Feb. 21, 1956   3 Sheets-Sheet 1
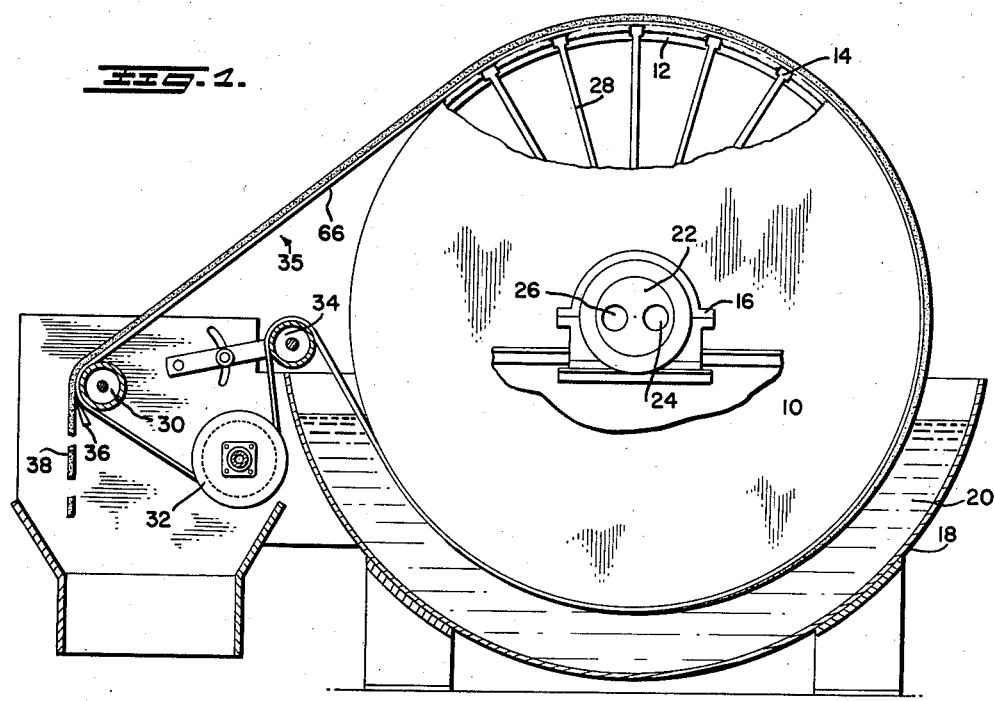
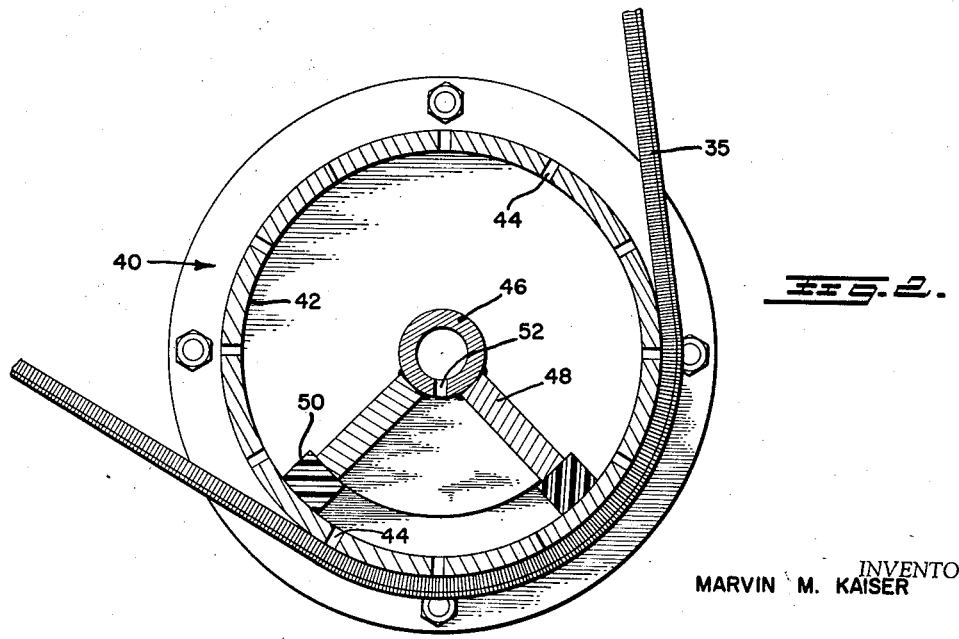
INVENTOR
MARVIN M. KAISER
BY *Harold T. Stowell*
ATTORNEY Dec. 8, 1959   M. M. KAISER   2,916,145
FILTER CONSTRUCTION
Filed Feb. 21, 1956   3 Sheets-Sheet 2

INVENTOR
MARVIN M. KAISER
BY Harold T. Stowell
ATTORNEY

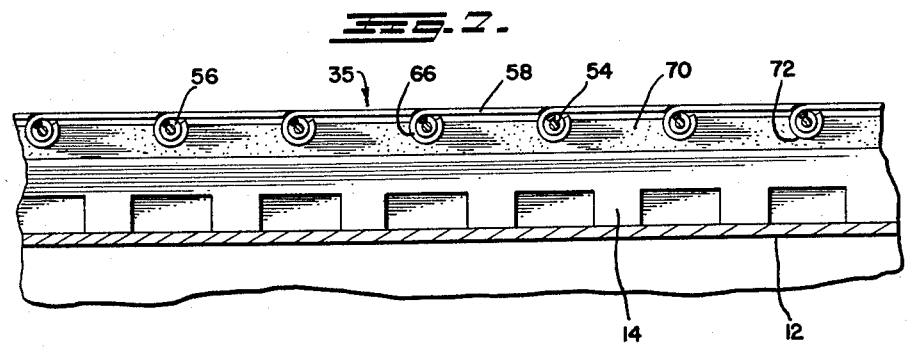
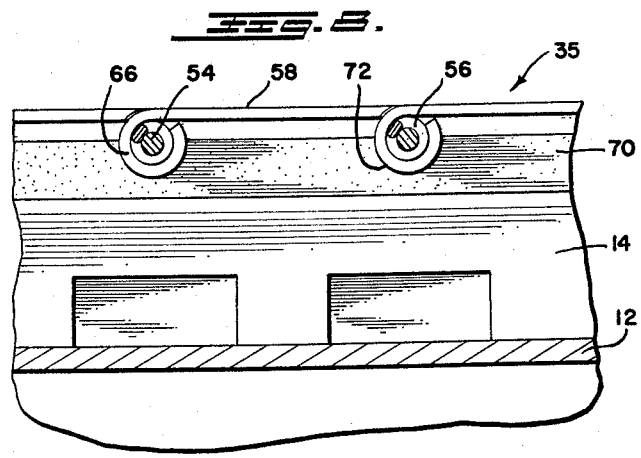
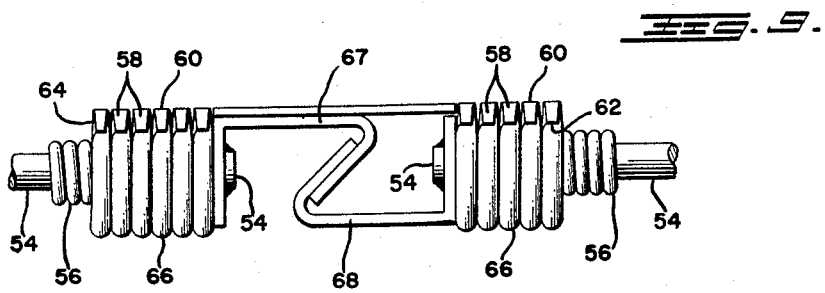

United States Patent Office 2,916,145
Patented Dec. 8, 1959

2,916,145

FILTER CONSTRUCTION

Marvin M. Kaiser, Garden City, N.Y., assignor, by mesne assignments, to The Eimco Corporation, Salt Lake City, Utah, a corporation of Delaware Application February 21, 1956, Serial No. 566,900

1 Claim. (Cl. 210—401)

This invention relates to filter media and more particularly and specifically to new and useful improvements in flexible, endless belt or web type filter media for use in conjunction with rotary drum filters.

It is a primary problem in utilizing endless web type continuous media in rotary drum filters to maintain high filtrate clarity over extended periods since most suspended materials in the usual slurries to be filtered tend to clog and blind the media after one or two passes of the media through the slurry. Such blinding and clogging of the filter media not only reduces the efficiency of filter operation, but it also tends to reduce the useful life of those filter media commonly in use.

To overcome the disadvantages created by blinded filter media, scrapers and wash sprays are employed to remove deposits from the media after each pass through the slurry to be filtered. However, commonly known and used woven fabric and felted filter media not only resist washing but they are also highly susceptible to extensive wear and damage resulting from scraper contact.

It is, therefore, a general object of the present invention to provide a new and improved filter media for use in the form of a travelling web on rotary drum filters which greatly reduces or eliminates the difficulties and problems heretofore inherent in filter media structures serving similar purposes.

It is a principal object of this invention to provide a novel flexible, metallic filter media for utilization as an endless filter web for rotary drum filters.

Another object of this invention resides in the provision of a flexible, metallic filter belt construction which resists wear and damage by scraper contact and provides for long serviceable use.

Still another object of the present invention is the provision of a novel flexible, metallic filter media construction which consists of an endless, flexible metallic belt formed of a plurality of spaced flexible wires extending longitudinally of the belt and a plurality of metallic bars supported transversely of the wires and compressed longitudinally of the belt into juxtaposition one with the next serially of the belt length thereby providing a segmented, finely perforated belt by the existence of limited space between adjacent bars longitudinally of the belt.

A further object of this invention is the provision of a novel and improved flexible, metallic belt construction of the type herein defined consisting of a plurality of metallic bars extending transversely of the belt in side by side relationship wherein each bar is tapered in wedgelike configuration from one face of the belt to the other.

A still further object of this invention is the provision of a flexible, metallic filter belt of the type herein defined wherein the flexible wires extending longitudinally of the belt are individually housed each in a continuous coil spring wherein said springs are disposed longitudinally between one of the surfaces of the belt defined by the transverse bars thereby providing with the bar portions affixed about said springs spacing support members which serve to hold the belt in a fixed spaced relationship to the deck of a filter drum when said web is positioned about such a drum with said spring housed wires disposed toward the drum deck.

Another object of this invention is the provision of a flexible, metallic filter belt of the type defined wherein the spacing between adjacent transverse bars forming the belt faces will be substantially increased when the belt is tensionally passed around a roller of small diameter thereby facilitating the cleaning of the media by wash sprays and scrapers.

Still another object of this invention is the provision of new and improved filter media construction forming a web for a rotary drum filter which is of relatively simple and inexpensive construction when considered in the light of its extreme durability and high rate of efficiency over periods of extended use.

Other objects and advantages of this invention will become more readily apparent to those skilled in the art when the following general statement and description are read in the light of the accompanying drawings.

The nature of the present invention may be stated in general terms as relating to a novel filter media construction for use as a continuous belt or web on rotary drum filters which includes a plurality of parallel spaced flexible wires each of which is enclosed longitudinally in a continuous coil spring, a plurality of metallic bar members secured transversely to said wire enclosing springs in close adjacency one to the other longitudinally of the springs, and said bar members being tapered in cross section in wedge-like configuration through their depth from one face of the belt to the other.

Referring now to the accompanying drawings in which like numerals indicate similar parts throughout the several views:

Fig. 1 is a side elevation in partial section of a rotary drum filter including the novel filter media of the present invention.

Fig. 2 is an enlarged sectional elevation of the wash roller as associated with the novel filter web of the present invention.

Fig. 7 is an enlarged sectional view taken longitudinally through the drum intermediate two drainage channels.

Fig. 8 is an enlarged fragmentary portion of Fig. 7.

Fig. 9 is a fragmentary elevation illustrating the interlocking web parts.

Figures 3, 4, 5, 6:
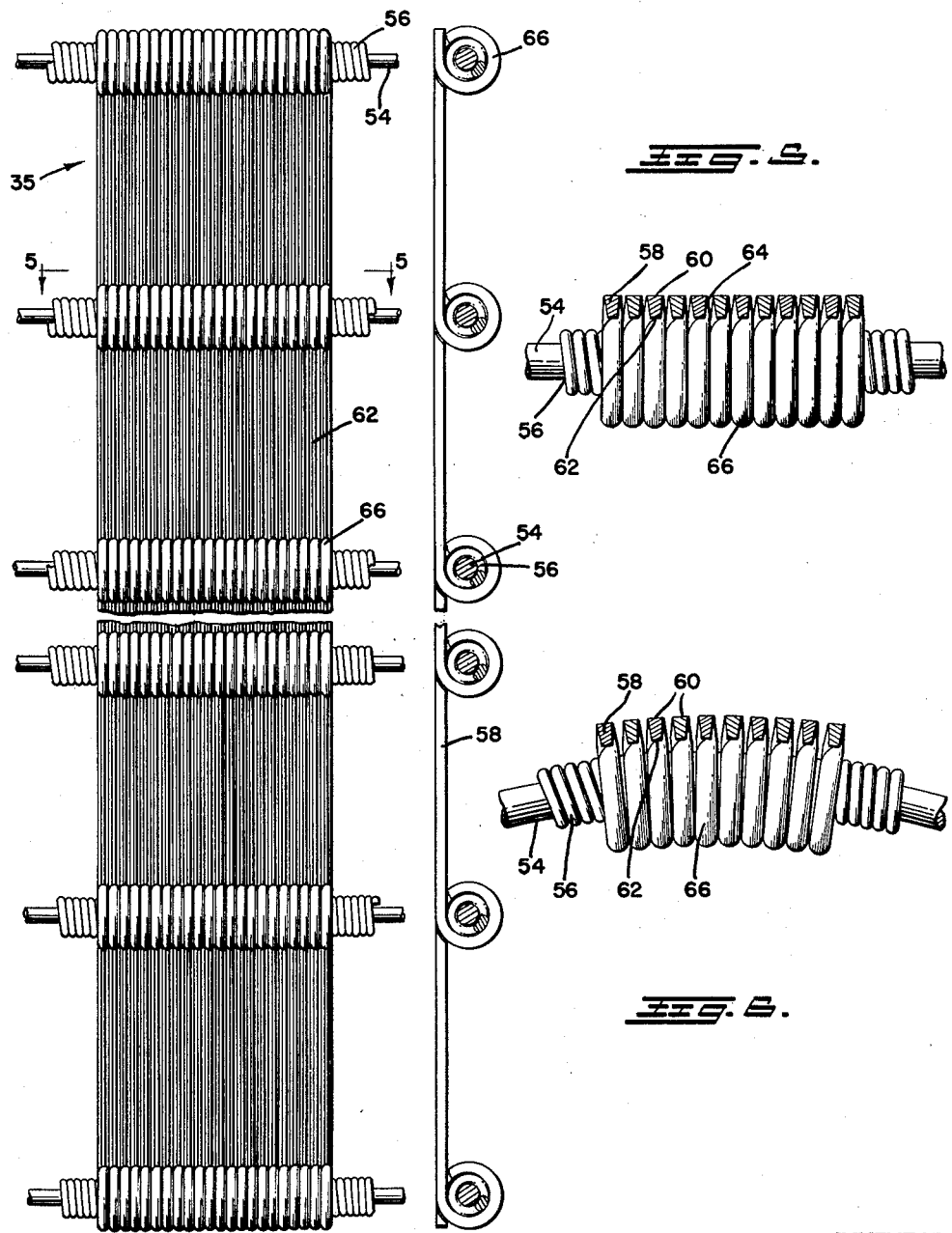
Fig. 3 is a plan view of the under or inner face of the improved filter web of this invention.
Fig. 4 is a side elevation of the construction shown in Fig. 3.
Fig. 5 is an enlarged fragmentary section taken on line 5—5, Fig. 4.
Fig. 6 is a view similar to Fig. 5 showing the filter web in a partially curvilinear flexed condition.

Referring to the drawings, and with particular reference to Fig. 1, 10 is a rotary drum provided with a continuous filter deck 12 thereabout which is divided into plural segments by longitudinally extending division strips 14. The drum is mounted at its ends in bearings 16 for rotation in a trough 18 containing a slurry 20 to be filtered.

One end of the drum 10 is provided with a conventional filter valve 22 which is connected through conduits 24 and 26 to a source of vacuum for the purpose of removing filtrate from the drum interior. A plurality of conduits 28 extend radially within the drum and connect the conduits 24 and 26 of the filter valve with drainage channels formed longitudinally in the division strips 14 on the drum deck.

The filter assembly is additionally provided in spaced relationship to the drum with a discharge roller 30, a wash roller 32 and a tension roller 34. The location of the above rollers is such that a continuous filter belt 35 (to be hereinafter described) which extends about the peripheral filter deck of the drum is passed tangentially from the drum deck at a point in the upper regions of the drum outwardly about the discharge roller, then around the wash roller and subsequently over the tension roller before again returning to the peripheral deck of the drum. The arc which the belt takes about the discharge roller is sufficient to permit the utilization of a deflector 36 to remove the usual filter cake 38 from the web as it leaves the roller in its travel toward the wash roller about which it, in turn, takes an acute turn.

The wash roller, as is more clearly illustrated in Fig. 2 of the drawings, consists of a drum 40 having a cylindrical barrel portion 42 in the wall of which is provided a plurality of spaced perforations 44 extending therethrough. The barrel is provided with a tubular supporting shaft 46 extending axially therethrough and about which the drum rotates by reason of bearings supporting the end heads of the barrel on the shaft.

The tubular supporting shaft 46 carries a pair of plates 48 which extend radially therefrom toward the cylindrical barrel portion 42, and the ends of said plates carry sealing members 50 which engage with the inner face of the cylindrical barrel portion 42. The tubular shaft 46 is provided with a plurality of outlets 52 spaced longitudinally thereof and opening from the tubular center of the shaft into that internal portion of the barrel bounded by the radially extending plates 48. One end of the tubular shaft 46 is connected to a source of pressure fluid such as steam, compressed air, water or solvent or the like so that such material when introduced into the cylindrical shaft will be discharged into that area within the barrel bounded by the plates 48 whereupon it will be discharged through perforations 44 in the rotating barrel portion as they pass between the sealing members 50 in the extended ends of the plates discharging therefrom against the inner surface of the filter belt 35 as it moves with the cylindrical barrel portion of the wash roller.

The novel filter belt 35 constituting the present invention, and particularly illustrated in Figs. 3 through 9 of the drawings, consists of an elongated flexible metallic construction which includes a plurality of coil springs 56 extending in parallel spaced relationship. Inserts 54 may be provided within the coil springs 56 to prevent air flow through these openings which would result in intercompartmental connection. The inserts 54 may be flexible metallic wires, plastic strands or the like. Associated with the coil springs 56 is a plurality of metallic bars 58 each of which is identical in construction and which takes the form of an elongated member of rhombic configuration in cross section having opposed parallel faces 60 and 62 interconnected by side faces 64 tapering uniformly in wedge-like fashion from face 60 to face 62. The bars are assembled transversely of the wires 56 by being bent to form circular eye portions 66 at points therealong coinciding with the spacing of the wires and springs with the eye formations being entirely below the faces 60 of the bars to provide a continuous surface along the length of the bar on the one face thereof. The eye formations 66 are of such a diameter as to permit them to telescope longitudinally over the coil springs 56 housing the inserts 54.

The plural bars 58 of the construction defined above are positioned transversely of the spaced wires and springs with the eye portions 66 thereof telescopically receiving the spring and wires with said bars being compressed longitudinally of the springs into close side by side adjacency to form a longitudinal, segmented belt having a substantially flat surface formed from the faces 60 of the plural bars 58 on one surface of the belt and a second face formed by the faces 62 of the bars longitudinally of the belt. The faces 60 of adjacent bars serially the length of the belt will be maintained in closely spaced relationship while the faces 62 of adjacent bars will be spaced at a greater distance apart by reason of the wedge-like tapered configuration of the bars through their depth. The belt construction is made continuous by joining remote ends of the inserts 54 and coil springs 56 which may be done to form a one-piece unit, or interlocking catch plates 67 and 68 (Fig. 9) may be rigidly secured to the remote ends of the wires 54 and springs 56 to permit a quick releasable coupling for the purpose of forming a releasable endless belt to facilitate application and removal of the web.

As is best seen in Figs. 5 and 6, the operation of the filter belt is such that when it is passed around a large diameter drum the spacing between adjacent bars is small thereby forming a tightly segmented belt which serves as an ideal filter media for filtering slurry in the usual fashion on the rotary drum. Additionally, when the filter belt is passed about the small diameter discharge and wash rollers the belt is flexed, as shown in Fig. 6, producing an increased spacing between adjacent bars thereby greatly facilitating the removal of clogging and binding deposits therefrom by wash sprays emanating from the perforations 44 of the wash roller and at the same time such flexing action serves to dislodge filter cake on the belt surfaces thus assisting the deflector 36 in removing deposits from the belt.

In Figs. 7 and 8 it can be seen that the necessity of supporting structure for the filter web 35 intermediate the spaced drainage channels 14 on the drum deck 12 is eliminated by reason of the formation of the eye portions or formations 66 disposed outwardly from that face of the filter belt adjacent the drum. A usual cushioning and sealing strip 70, of rubber or like resilient material is provided longitudinally of the top surface of each drainage channel and the eye formations 66 on the inwardly disposed face of the filter belt imbed themselves as at 72 in the upper face of the cushioning strip to securely position the belt about the drum in bridging condition over the spaced drainage channels while the eye formations 66 intermediate adjacent drainage channels will serve, by abutting with the drum deck, to space the filter belt outwardly from the drum deck to provide the necessary drum deck surface drainage for efficient filtration.

From the foregoing it can be seen that a greatly improved filter media construction has been provided by the utilization of a flexible metallic belt of great durability which presents a substantially flat surface for the formation of filter cake, which facilitates the removal of cake therefrom, and which provides for a flexible construction capable of expansion during spray washing to increase the segmental spacing of the media to permit increased wash action through the media thereby ultimately increasing the efficiency of the filter.

It is also to be noted that the particular construction described provides through the formation of the eye formations 66 on one side of the belt supporting structure for maintaining the filter belt at a spaced distance outwardly from the drum deck thereby eliminating the necessity of costly channelling and costly filter belt support members heretofore required in drum constructions.

It is additionally evident that a novel and improved filter media construction has been provided which satisfies all of the objects and advantages heretofore set forth.

Having thus described a preferred form of my invention and its unique and useful functions, what I desire to claim is:

In a rotary filter, a filter drum having a cylindrical filter deck, means mounting said filter drum for rotation on a generally horizontal axis, a discharge roller having a diameter substantially less than the diameter of said filter drum, means mounting said roller with its axis of rotation parallel to and spaced from the axis of said filter drum, and a continuous filter web trained about a portion of the filter deck of said filter drum and said discharge roller, said filter web consisting of a plurality of rigid bar members disposed in side-by-side relationship transversely of travel of said filter drum, each of said bar members provided with a plurality of downwardly depending spaced circular eye portions, said eye portions positioned in alignment with a corresponding eye portion of adjacent bar members thereby forming a plurality of elongate passageways extending parallel to the direction of travel of said filter web, a coil spring snugly engaged within each of the elongate passageways formed by said eye portions thereby securing said bar members against lateral displacement, said bar members having a wedge-like tapered cross-sectional configuration to thereby effect an increased spacing between adjacent bar members when said filter web is passed around said discharge roller to thereby facilitate the removal of clogging and binding deposits from said filter web.

References Cited in the file of this patent

UNITED STATES PATENTS

| | | |
|---|---|---|
| 828,715 | Cook | Aug. 14, 1906 |
| 2,416,073 | Smely | Feb. 18, 1947 |
| 2,518,046 | Miller | Aug. 8, 1950 |
| 2,652,927 | Komline | Sept. 22, 1953 |
| 2,690,265 | Bixby | Sept. 28, 1954 |
| 2,699,260 | Komline | Jan. 11, 1955 |

FOREIGN PATENTS

| | | |
|---|---|---|
| 848,797 | Germany | Sept. 8, 1952 |

UNITED STATES PATENT OFFICE

CERTIFICATE OF CORRECTION

Patent No. 2,916,145            December 8, 1959

Marvin M. Kaiser

It is hereby certified that error appears in the printed specification of the above numbered patent requiring correction and that the said Letters Patent should read as corrected below.

Column 5, line 3, after "transversely" insert -- to the direction --.

Signed and sealed this 5th day of June 1960.

(SEAL)

Attest:

KARL H. AXLINE
Attesting Officer

ROBERT C. WATSON
Commissioner of Patents